United States Patent [19]

Barthélemy et al.

[11] Patent Number: 5,264,463

[45] Date of Patent: Nov. 23, 1993

[54] FLAME-RETARDANT RIGID POLYURETHANE FOAMS, COMPOSITIONS INTENDED FOR MANUFACTURING THEM AND PROCESS FOR MANUFACTURING THE FOAMS

[75] Inventors: Pierre Barthélemy, Pietrebais; Annie Leroy, Fauvillers, both of Belgium

[73] Assignee: Solvay (Société Anonyme), Brussels, Belgium

[21] Appl. No.: 42,409

[22] Filed: Apr. 2, 1993

[30] Foreign Application Priority Data

Apr. 7, 1992 [BE] Belgium .............................. 9200316

[51] Int. Cl.$^5$ ................................ C08J 9/14
[52] U.S. Cl. .................... 521/117; 521/131; 521/155
[58] Field of Search .............. 521/131, 117, 155

[56] References Cited

U.S. PATENT DOCUMENTS

| | | |
|---|---|---|
| 3,726,855 | 4/1973 | Lapkin . |
| 4,020,024 | 4/1977 | Walraevens et al. . |
| 4,067,911 | 1/1978 | Walraevens et al. . |
| 4,072,638 | 2/1978 | Boulet et al. . |
| 4,173,710 | 11/1979 | Boulet et al. . |
| 4,314,038 | 2/1982 | Markovs .............. 521/167 |
| 4,454,251 | 6/1984 | Frisch et al. . |
| 4,714,720 | 12/1987 | Colling . |
| 4,722,942 | 2/1988 | Nichols et al. . |
| 4,997,858 | 3/1991 | Jourquin et al. ......... 521/131 |
| 5,210,106 | 5/1993 | Dams et al. ............ 521/131 |

FOREIGN PATENT DOCUMENTS 0221586 4/1990 European Pat. Off. .

OTHER PUBLICATIONS

David S. Gubrud, "Blowing Agent Alternatives for Sprayed Polyurethane Foam", *Proc. SPI Annu. Tech.-/Mark. Conf.*, 31st(*Polyurethanes* 88), 1988, pp. 159–163.

*Primary Examiner*—Morton Foelak
*Attorney, Agent, or Firm*—Spencer, Frank & Schneider

[57] ABSTRACT

The invention relates to flame-retardant rigid polyurethane foams produced using halogenated polyether-polyols and at least one blowing agent chosen from 1,1-dichloro-1-fluoroethane and 1,1,1-trifluoro-2,2-dichloroethane in the presence of ethylene glycol. It also relates to compositions intended for their manufacture and to a process for manufacturing them.

The rigid foams according to the invention exhibit an improved fire resistance and an improved dimensional stability.

6 Claims, No Drawings

FLAME-RETARDANT RIGID POLYURETHANE FOAMS, COMPOSITIONS INTENDED FOR MANUFACTURING THEM AND PROCESS FOR MANUFACTURING THE FOAMS

The present invention relates to flame-retardant rigid polyurethane foams, to compositions intended for manufacturing them, and to a process for the manufacture of these polyurethane foams (hereafter denoted by the term "PUR"). It relates more particularly to flame-retardant rigid PUR foams and to the compositions intended for producing them based on halogenated polyether-polyols and chlorofluorinated hydrocarbons containing hydrogen (hereafter denoted by the term "HFA") as blowing agent(s).

It is well known to use halogenated polyetherpolyols for the manufacture of flame-retardant rigid PUR foams by reaction with organic polyisocyanates. Moreover, it is known that the conventional blowing agents of the completely halogenated chlorofluoroalkane type, such as, for example, trichlorofluoromethane, which is the most widely used blowing agent, are currently suspected of having a harmful effect on the ozone layer. For this reason, it is increasingly being sought to replace the usual blowing agents of the completely halogenated chlorofluoroalkane type by HFAs whose ozone destructive potential (ODP) is markedly lower. Among these, 1,1-dichloro-1-fluoroethane (HFA-141b) and 1,1,1-trifluoro-2,2-dichloroethane (HFA-123) appear as blowing agents which can be used for manufacturing rigid PUR foams, although their use has a certain number of disadvantages, such as the reduction in fire resistance and in dimensional stability of the PUR foams produced with their involvement. The reduction in fire resistance can be of such an extent that a rigid PUR foam manufactured using halogenated polyether-polyols in the presence of a phosphorated additive and of trichlorofluoromethane as blowing agent, rated as $M_1$ in the external radiation test (according to French Standard NF-P 92-501), is only rated as $M_2$ in this same test when the said blowing agent is substituted by HFA-141b or HFA-123, everything else being equal.

The aim of the present invention is to provide flame-retardant rigid PUR foams produced using halogenated polyether-polyols and blowing agents of the HFA type which exhibit an improved flame-retardant level and an improved dimensional stability. It also relates to a composition intended for the manufacture of flame-retardant rigid PUR foams comprising HFAs as blowing agents, and to a process for the manufacture of flame-retardant rigid PUR foams.

To this end, the invention relates to flame-retardant rigid PUR foams produced using halogenated polyether-polyols and at least one blowing agent chosen from 1,1-dichloro-1-fluoroethane (HFA-141b) and 1,1,1-trifluoro-2,2-dichloroethane (HFA-123) in the presence of ethylene glycol.

The invention also relates to a composition ("premix") intended for the manufacture of flame-retardant rigid PUR foams, characterised in that it comprises, by way of essential ingredients, at least one halogenated polyether-polyol, at least one blowing agent chosen from 1,1-dichloro-1-fluoroethane (HFA-141b) and 1,1,1-trifluoro-2,2-dichloroethane (HFA-123), and ethylene glycol.

The invention also relates to a process for the manufacture of flame-retardant rigid PUR foams by reaction of halogenated polyether-polyols with organic polyisocyanates in the presence of a blowing agent comprising a chlorofluorinated hydrocarbon containing hydrogen chosen from 1,1-dichloro-1-fluoroethane (HFA-141b) and 1,1,1-trifluoro-2,2-dichloroethane (HFA-123), and ethylene glycol.

Halogenated polyether-polyols are intended to denote, for the purposes of the present invention, chlorinated, brominated or chlorobrominated halogenated polyether-polyols, consisting essentially of the addition products of alkene oxides, a part at least of which consists of halogenated alkene oxides, such as epichlorohydrin, epibromohydrin, the oxides of 3,3-dihalopropene and of 3,3,3-trihalopropene with an initiating monomeric polyol, optionally halogenated, such as, for example, ethylene glycol, glycerol, the monohalohydrins of glycerol, dibromoneopentyl glycol and 2,3-di-bromo-1,4-butenediol, and the mixtures of such halogenated polyether-polyols. Halogenated polyether-polyols of this type, essentially aliphatic in nature, are described, for example, in Belgian Patent Nos. 798,674 of the Apr. 25, 1973 or 821,314 of the Oct. 22, 1974 and European Pat. No. 0,221,586 of the Apr. 11, 1990, all on behalf of the applicant and incorporated here by way of references.

Although the halogenated polyether-polyols described above constitute one of the essential ingredients of the PUR foams according to the invention (and of the compositions intended to produce these foams), this does not exclude, depending upon the desired flame-retardant level, the use of mixtures of such halogenated polyether-polyols with non-halogenated polyether-polyols. The concept "halogenated polyether-polyols" such as is used in the context of the present invention thus also includes the halogenated polyether-polyols as well as their mixtures with non-halogenated polyether-polyols. Such mixtures of polyether-polyols generally comprise at least 30% by weight of halogenated polyether-polyols, preferably at least 50% by weight and more particularly still at least 70% by weight of halogenated polyether-polyols.

It is understood that the mean hydroxyl index and the mean functionality of the halogenated polyether-polyols such as are defined above and used in the present invention are those usually chosen for producing rigid PUR foams. In this case, the mean hydroxyl index of the polyether-polyols (and their mixtures) used will be at least equal to 250 mg KOH/g and their mean functionality to at least 3. Preferably, halogenated polyether-polyols, and mixtures containing them, will be used in which the mean hydroxyl index is between approximately 300 and 500 mg KOH/g. Their functionality will depend, of course, on the functionality of the initiating monomeric polyol on the functionality of the initiating monomeric polyol used to produce them. In general, the mean functionality of the polyether-polyols does not exceed 8. Preferably, it does not exceed 4.

The present invention results from the observation that the rigid PUR foams produced using halogenated polyether-polyols, such as are defined above, and at least one blowing agent chosen from HFA-141b and HFA-123 in the presence of ethylene glycol exhibit a markedly improved fire resistance and a markedly improved dimensional stability. An entirely unforeseeable result resulting from the use of ethylene glycol lies in the improvement of the flame-retardant properties of the rigid PUR foams. Indeed, with an identical isocyanate index (i.e. molar ratio between all the hydroxyl functional groups and the isocyanate functional groups), the use of ethylene glycol involves the use of a greater quantity of organic polyisocyanate, which overall reduces the flame-retardant halogenated polyether-polyol content in the composition used for producing the rigid PUR foam. A surprising effect of the present invention lies, moreover, in the fact that the use of other aliphatic polyols, such as glycerol, an aliphatic polyol whose hydroxyl index is virtually identical to that of ethylene glycol, has no beneficial effect on the flame-retardant properties of the PUR foams produced.

The quantity of ethylene glycol present in the rigid PUR foams (and in the compositions intended for producing them) according to the invention is not particularly critical. Quantities as low as 0.5 part of ethylene glycol per 100 parts by weight of polyether-polyols already generally produce a measurable positive effect on the fire resistance and the linear deformation (shrinkage) of the rigid PUR foam. Nevertheless, it is preferred to use at least approximately 1 part, more particularly at least approximately 1.5 parts, per 100 parts by weight of polyether-polyols (in total). Within certain limits, the increase in the ethylene glycol content further improves the results. However, no charge of approximately 6.5 parts per 100 parts by weight of polyether-polyols. Generally, the charge does not exceed approximately 5 parts and more particularly approximately 4 parts per 100 parts by weight of polyether-polyols.

The blowing agents HFA-141b and HFA-123 used to produce the PUR foams according to the invention can be used alone or as a mixture or else as a mixture with conventional blowing agents.

Nevertheless, it is preferable that all the blowing agent consists of HFA-141b and/or of HFA-123. Preferably, all the blowing agent used for the manufacture of rigid PUR foams according to the invention consists of HFA-141b.

The quantity of blowing agent used depends, of course, on the desired density of the foam. In order to give an idea, the blowing agent is generally used (and is present in the PUR foams and in the compositions intended for their manufacture) at a concentration of approximately 10 to 35 parts per 100 parts by weight of polyether-polyols and, in particular, at a concentration of approximately 15 to 30 parts per 100 parts by weight of polyether-polyols. The use of the blowing agent (or of the mixture of blowing agents) in the abovementioned quantities generally leads to rigid PUR foams whose apparent density in a closed mould is between approximately 20 and 60 kg/m and, in particular, between approximately 30 and 40 kg/m$^3$.

According to a preferred embodiment of the invention, the rigid PUR foams are produced in the presence also of a phosphorated organic compound. It is well known to improve the flame-retardant of rigid PUR foams by incorporating phosphorated organic compounds, generally optionally halogenated phosphoric esters or phosphonates.

The use of these phosphorated additives, which act in synergy with the halogenated polyether-polyols at the flame-retardant level, is generally recommended in order to achieve the highest flame-retardant levels, such as class $M_1$ in the external radiation test (according to Standard NF-P 92-501). Nevertheless, they exhibit the well-known disadvantage of having a plasticising effect on the rigid PUR foams and, for this reason, of reducing their mechanical properties and especially their dimensional stability. The use of ethylene glycol in the manufacture of PUR foams using halogenated polyether-polyols and HFA-141b and/or HFA-123 blowing agent in the presence of phosphorated organic compounds is particularly advantageous, in that it makes it possible to neutralise the undesirable effects linked to the presence of phosphorated additives on the mechanical properties of the rigid PUR foams, without harming their flame-retardant properties.

By way of non-limiting examples of phosphorated organic compounds which can be used for the manufacture of the preferred rigid PUR foams according to the invention (and of the compositions intended for producing them), there may be mentioned organic phosphates such as triethyl phosphate (TEP), tris(chloropropyl) phosphate (TCPP) or else phosphonates, such as, for example, dimethyl phosphonate.

The quantity of these phosphorated additives present in the rigid PUR foams according to the invention (and in the compositions intended for preparing them) can vary within certain limits depending on the desired flame-retardant effect. To give an idea, this quantity can vary between approximately 0.5 and 6 parts, expressed as phosphorus, per 100 parts by weight of polyether-polyols. Generally, it is not useful to exceed a content of approximately 5 parts, expressed as phosphorus, per 100 parts by weight of polyether-polyols. Preferably, the rigid PUR foams (and the compositions intended for manufacturing them) according to the invention contain phosphorated organic compounds in quantities corresponding to approximately 0.8 to 4.9 parts and, more particularly still, to approximately 0.8 to 3 parts, expressed as phosphorus, per 100 parts by weight of polyether-polyols. The simultaneous presence of ethylene glycol and the phosphorated organic additive leads to a synergy effect on the fire resistance level.

The halogenated polyether-polyols as defined, at least one blowing agent chosen from HFA-141b and HFA-123, ethylene glycol and, if appropriate, a phosphorated organic compound thus constitute the characteristic and essential ingredients of the flame-retardant rigid PUR foams according to the invention and of the compositions intended for their manufacture. It is obvious that, in order to manufacture PUR foams using polyether-polyols, the latter should be reacted with organic polyisocyanates.

For this purpose, the invention relates to a process for the manufacture of flame-retardant rigid PUR foams by reaction of halogenated polyether-polyols with organic polyisocyanates in the presence of a blowing agent, characterised in that the blowing agent comprises a chlorofluorinated hydrocarbon containing hydrogen chosen from 1,1-dichloro-1-fluoroethane (HFA-141b) and 1,1,1-trifluoro-2,2-dichloroethane (HFA-123) and in that the reaction is carried out in the presence of ethylene glycol.

All the known organic polyisocyanates commonly used for the manufacture of rigid PUR foams can be used in the process of the invention. By way of non-limiting examples of polyisocyanates which can be used, there may be mentioned methylenebis(4-phenylisocyanate) in the pure or partially polymerised state, tolylene diisocyanates in the pure or partially polymerised state and 1,5-naphthalene diisocyanate.

The theoretical quantity of organic polyisocyanate necessary for the manufacture of PUR is calculated, in a known way, depending on the overall hydroxyl index, that is to say that of the polyether-polyols(s), ethylene glycol and, if appropriate, water present in the formulations. A slight excess of polyisocyanate is advantageously used, for example an index of at least 105, with a view to improving the resistance to heat distortion of the foam. Generally, the isocyanate index does not exceed 150. Preferably, it is between approximately 105 and 120.

Besides the essential ingredients described above which should be used in the process for manufacturing the flame-retardant rigid PUR foams according to the invention (that is halogenated polyether-polyols, organic polyisocyanates, at least one blowing agent chosen from HFA-141b and HFA-123, ethylene glycol and, if appropriate, a phosphorated organic compound), the reaction mixture will, of course, contain all the usual ingredients for the manufacture of PUR foams, namely one or a number of catalysts, optionally water, surface-active and/or stabilising agents, fillers, pigments and the like.

The catalyst can be any one of the catalysts known as being used for this purpose, especially the tertiary amines such as N,N-dimethylbenzylamine, triethylenediamine, triethylamine or dimethylaminoethanol, and the salts of antimony, tin and iron.

The quantity of catalyst can vary to a certain extent. In the order of 0.5 to 4% by weight of catalyst is generally used with respect to the polyether-polyols.

The surface-active agent (which contributes to improving the cell structure) is generally present at a concentration of approximately 0.2 to 2% by weight with respect to the polyether-polyols.

The rigid PUR foams according to the invention can be manufactured by any conventional foam-forming process, such as the one-step process known as "one shot", the processes using a premix, a prepolymer or a semi-prepolymer or the pre-expansion process known as "frothing".

A process to which preference is given is that using a premix, in which a composition comprising, by way of essential ingredients, the polyether-polyols and the blowing agent is used, the organic polyisocyanates only being reacted with this composition (generally called "premix") at the time of the manufacture of the PUR foam. Besides the abovementioned essential ingredients, these compositions contain all the usual ingredients of the premixes, namely catalysts, if appropriate water, surface-active or stabilising agents, pigments, fillers and the like as described above and, moreover, well known to one skilled in the art.

The compositions according to the invention containing, by way of essential ingredients, at least one halogenated polyether-polyol, at least one blowing agent chosen from 1,1-dichloro-1-fluoroethane and 1,1,1-trifluoro-2,2-dichloroethane, and ethylene glycol and, if appropriate, a phosphorated organic compound are very particularly suitable for the manufacture of rigid PUR foams according to the invention by the premix process.

The flame-retardant rigid PUR foams of invention can be used in all the conventional fields of use of rigid PUR foams where fire resistance constitutes a desirable, or even indispensable, property, such as building, furniture and thermal insulation.

The examples which follow are intended to illustrate the invention. All illustrate flame-retardant rigid PUR foams produced from premixes (compositions) based on halogenated polyether-polyols comprising a blowing agent chosen from HFA-141b and HFA-123 reacted with an organic polyisocyanate consisting of crude methylenebis(4-phenylisocyanate) (crude MDI) used with an index of 110. In all the examples, the catalyst is a tertiary amine (N,N-dimethylbenzylamine). The complete formulations used in the examples appear in the appended Tables I to IV.

The rigid PUR foams are produced by hand following the general procedure below.

The polyether-polyol, the surface-active agent (silicone), water and the blowing agent are introduced successively into a mixing bowl. After a first stirring, the catalyst is added. The polyisocyanate is then added to the entirely homogeneous premix. The resulting mixture is immediately stirred and then run into a mould where expansion and maturing of the foam is carried out.

The overall apparent density in a closed mould (AD), the linear deformation before cutting after storing for 1 month while exposed to the air, the dimensional stability according to ISO Standard 2796 and finally the classification by the external radiation test according to French Standard NF-P 92-501 were evaluated on the blocks of rigid PUR foams thus produced.

EXAMPLES 1 TO 3 (cf. TABLE I)

In Examples 1 to 3, a chlorobrominated polyether-polyol (marketed under the tradename Ixol ® B350) is used, the main characteristics of which are:

| | |
|---|---|
| hydroxyl index | 353 mg KOH/g |
| equivalent weight | 159 |
| mean functionality | 3 |
| chlorine content | approx. 7.3% by weight |
| bromine content | approx. 34.2% by weight |

Examples 1 and 2, according to the invention, illustrate rigid PUR foams manufactured from premixes (compositions) containing 2 parts of ethylene glycol (EG) per 100 parts by weight of Ixol ® B350 polyether-polyol. The premix of Example 3R, given by way of comparison, is free of ethylene glycol. In Example 1, the blowing agent is HFA-123. In Examples 2 and 3R, the blowing agent is HFA-141b.

The rigid PUR foams produced (cf. Table I) in Examples 1 and 2 according to the invention are classed as $M_1$ in the external radiation test whereas the foam produced according to Example 3R (in the absence of ethylene glycol) is classed as $M_2$ in this same test. Additionally, the foams produced according to Examples 1 and 2 have a linear deformation after storing for 1 month (shrinkage) which is identical to, if not less than, and a dimensional stability which is greater than that of a foam produced in the absence of ethylene glycol (Example 3R, for comparison).

EXAMPLES 4 TO 15

In Examples 4 to 15, a chlorobrominated polyether-polyol containing a phosphorated diluent (marketed under the tradename Ixol ® B251) is used, the main characteristics of which are:

| | |
|---|---|
| hydroxyl index | 330 mg KOH/g |
| equivalent weight | 170 |
| mean functionality | 3 |
| chlorine content | approx. 6.8% by weight |
| bromine content | approx. 32% by weight |
| phosphorus content | approx. 1.1% by weight |

EXAMPLES 4 TO 8 (cf. Table II)

In Examples 4 to 8, the blowing agent is HFA-123.

Examples 6 and 7, according to the invention, illustrate rigid PUR foams produced from premixes containing 10 parts of triethyl phosphate (TEP) and respectively 2 and 4 parts of ethylene glycol (EG) per 100 parts by weight of Ixol ® B251 polyether-polyol (already containing a phosphorated diluent).

Example 4R, given by way of comparison, relates to a premix which is free of TEP and of ethylene glycol. Example 5R, given by way of comparison, relates to a premix containing 10 parts of TEP but no ethylene glycol.

Example 8R, given by way of comparison, relates to a premix containing 10 parts of TEP and 4 parts of glycerol.

The rigid PUR foam produced in Example 4R (cf. Table II) is classed as $M_2$ in the external radiation test and exhibits a shrinkage of 0.5%. The foam produced in Example 5R from a premix enriched in phosphorated additive (TEP) is classed as $M_1$ in the external radiation test, but the shrinkage of the foam rises to 2%. The foam produced in Example 6, according to the invention, (in the presence of 2 parts of EG) is classed as $M_1$ in the external radiation test with a shrinkage reduced to 0.9%. The foam produced in Example 7, according to the invention, (in the presence of 4 parts of EG) is still classed as $M_1$ in the external radiation test with a shrinkage reduced to 0.6%, that is of the same order of size as that of a foam produced from a premix markedly less rich in phosphorated diluent, classed as $M_2$ in the external radiation test (Example 4R) and, moreover, markedly weaker than a foam, produced using a premix containing the same content of phosphorated additive, classed as $M_1$ (Example 5R). Finally, Example 8R testifies that the addition of 4 parts of glycerol to the premix produces, everything else being equal, foams classed as $M_2$ in the external radiation test whose shrinkage is greater than that of foams produced using the same quantity of ethylene glycol.

EXAMPLES 9R TO 11 (cf. TABLE III)

In Examples 9R to 11, the blowing agent is HFA-141b. Example 11, according to the invention, illustrates a rigid PUR foam produced from a premix containing 10 parts of triethyl phosphate (TEP) and 4 parts of ethylene glycol (EG) per 100 parts by weight of Ixol ® B251 polyether-polyols.

Example 9R, given by way of comparison, relates to a premix which is free of TEP and of ethylene glycol. Example 10R, given by way of comparison, relates to a premix containing 10 parts of TEP but no ethylene glycol.

The rigid PUR foam produced in Example 9R (cf. Table III) is classed as $M_2$ in the radiation test and exhibits a shrinkage of 0.4%. The foam produced in Example 10R from a premix enriched in phosphorated additive (TEP) is classed as $M_1$ in the external radiation test, but the shrinkage of the foam rises to 1.5%. The foam produced in Example 11, according to the invention, (in the presence of 4 parts of EG) is classed as $M_1$ in the external radiation test with a shrinkage reduced to 0.4%, that is to say equal to that of a foam, classed as $M_2$, produced from a premix which is markedly less rich in phosphorated additive (Example 9R) and, moreover, markedly lower than that of a foam, also classed as $M_1$, produced from a premix containing the same quantity of phosphorated additive (but no ethylene glycol) (Example 10R).

EXAMPLES 12R TO 15 (cf. TABLE IV)

Examples 14 and 15, according to the invention, illustrate rigid PUR foams produced from premixes containing 10 parts of tris(chloropropyl) phosphate (TCPP) and respectively 2 and 4 parts of ethylene glycol (EG) per 100 parts by weight of Ixol ® B251 polyether-polyols.

Example 12R, given by way of comparison, relates to a premix containing 10 parts of TCPP but free of ethylene glycol. Example 13R, given by way of comparison, relates to a premix containing 10 parts of TCPP and 4 parts of glycerol.

The rigid PUR foam produced in Example 12R is classed as $M_2$ in the external radiation test and exhibits a shrinkage of 1.6%. The foam produced in Example 13R from a premix containing the same content of phosphorated additive as the premixes according to Examples 14 and 15, but containing 4 parts of glycerol, leads to a foam, classed as $M_2$ in the external radiation test, the shrinkage of which is greater than that of the foam produced using 4 parts of EG (Example 15) and of the same order of size as a foam produced using only 2 parts of EG (Example 14).

TABLE I

| | No. of the example | | |
|---|---|---|---|
| | 1 | 2 | 3R |
| Composition of the premix, parts by weight | | | |
| Ixol ® B350 polyether-polyol | 100 | 100 | 100 |
| Ethylene glycol | 2 | 2 | — |
| Silicone | 2 | 2 | 2 |
| Water | 1 | 1 | 1 |
| HFA-123 | 27 | — | — |
| HFA-141b | — | 22 | 23 |
| Catalyst | 2 | 2 | 2.2 |
| MDI, isocyanate index 110 | 110.5 | 120.5 | 110.5 |
| Evaluation of the PUR foam | | | |
| Cream time, s | 41 | 43 | 43 |
| Wire time, s | 97 | 102 | 104 |
| AD, kg/m$^3$ | 36 | 35.6 | 35.2 |
| Linear deformation, % (shrinkage) | 0.2 | 0.1 | 0.2 |
| Dimensional stability (ISO 2796) | | | |
| after 7 days at 100° C., % | 2.25 | 1 | 2 |
| after 7 days at 70° C., 90% RH, % | 2 | 1 | 2.5 |
| after 7 days at −30° C., % | −1.25 | 0 | −2.5 |
| Classification by the external radiation test (NF-P 92-501) | $M_1$ | $M_1$ | $M_2$ |

TABLE II

| | No. of the example | | | | |
|---|---|---|---|---|---|
| | 4R | 5R | 6 | 7 | 8R |
| Composition of the premix,* parts by weight | | | | | |
| Ixol ® B251 polyether-polyol | 100 | 100 | 100 | 100 | 100 |
| TEP | — | 10 | 10 | 10 | 10 |
| Ethylene glycol | — | — | 2 | 4 | — |
| Glycerol | — | — | — | — | 4 |
| Silicone | 2 | 2 | 2 | 2 | 2 |
| Water | 1 | 1 | 1 | 1 | 1 |
| HFA-123 | 28 | 29 | 30 | 30 | 30 |
| Catalyst | 2 | 2.2 | 2.2 | 2.2 | 2.2 |
| *Phosphorus content, parts per 100 parts of polyether-polyol | 1.1 | 3.44 | 3.4 | 3.4 | 3.4 |

TABLE II-continued

|  | No. of the example | | | | |
|---|---|---|---|---|---|
|  | 4R | 5R | 6 | 7 | 8R |
| MDI, isocyanate index 110 | 104.3 | 104.3 | 113.9 | 123.6 | 123.7 |
| Evaluation of the PUR foam | | | | | |
| Cream time, s | 44 | 43 | 45 | 46 | 47 |
| Wire time, s | 108 | 103 | 106 | 102 | 113 |
| AD, kg/m$^3$ | 36 | 35.4 | 36 | 36.2 | 36.2 |
| Linear deformation, % (shrinkage) | 0.5 | 2 | 0.9 | 0.6 | 1.2 |
| Dimensional stability (Iso 2796) | | | | | |
| after 7 days at 100° C., % | 3 | 4.75 | 3 | 2 | 2.5 |
| after 7 days at 70° C., 90% RH, % | 3 | 5.25 | 4 | 2 | 3.5 |
| after 7 days at −30° C., % | 0 | 0 | 0 | 0 | 0 |
| Classification by the external radiation test (NF-P 92-501) | M$_2$ | M$_1$ | M$_1$ | M$_1$ | M$_2$ |

TABLE III

|  | No. of the example | | |
|---|---|---|---|
|  | 9R | 10R | 11 |
| Composition of the premix,* parts by weight | | | |
| Ixol ® B251 polyether-polyol | 100 | 100 | 100 |
| TEP | — | 10 | 10 |
| Ethylene glycol | — | — | 4 |
| Silicone | 2 | 2 | 2 |
| Water | 1 | 1 | 1 |
| HFA-141b | 23 | 22 | 24 |
| Catalyst | 2 | 2 | 2.2 |
| *Phosphorus content, parts per 100 parts of polyether-polyol | 1.1 | 3.4 | 3.4 |
| MDI, isocyanate index 110 | 104.3 | 104.3 | 123.6 |
| Evaulation of the PUR foam | | | |
| Cream time, s | 45 | 43 | 48 |
| Wire time, s | 110 | 107 | 103 |
| AD, kg/m$^3$ | 35.7 | 36.2 | 35.3 |
| Linear deformation, % (shrinkage) | 0.4 | 1.5 | 0.4 |
| Dimensional stability (ISO 2796) | | | |
| after 7 days at 100° C., % | 2.5 | 4.5 | 2 |
| after 7 days at 70° C., 90% RH, % | 2 | 4.5 | 1 |
| after 7 days at −30° C., % | 0 | 0 | 0 |
| Classification by the external radiation test (NF-P 92-501) | M$_2$ | M$_1$ | M$_1$ |

TABLE IV

|  | No. of the example | | | |
|---|---|---|---|---|
|  | 12R | 13R | 14 | 15 |
| Composition of the premix,* parts by weight | | | | |
| Ixol ® B251 polyether-polyol | 100 | 100 | 100 | 100 |
| TCPP | 10 | 10 | 10 | 10 |
| Ethylene glycol | — | — | 2 | 4 |
| Glycerol | — | 4 | — | — |
| Silicone | 2 | 2 | 2 | 2 |
| Water | 1 | 1 | 1 | 1 |
| HFA-141b | 22 | 24 | 23 | 24 |
| Catalyst | 2.2 | 2.2 | 2.2 | 2.2 |
| *Phosphorus content, parts per 100 parts of polyether-polyol | 2.1 | 2.1 | 2.1 | 2.1 |
| MDI, isocyanate index 110 | 104.3 | 123.7 | 113.9 | 123.4 |
| Evaluation of the PUR foam | | | | |
| Cream time, s | 42 | 45 | 40 | 42 |
| Wire time, s | 95 | 102 | 90 | 93 |
| AD, kg/m$^3$ | 36.1 | 36 | 35.6 | 36.2 |
| Linear deformation, % (shrinkage) | 1.6 | 0.9 | 1 | 0.7 |
| Dimensional stability (ISO 2796) | | | | |
| after 7 days at 100° C., % | 2.5 | 1.25 | 2.25 | 1.5 |
| after 7 days at 70° C., 90% RH, % | 2.25 | 1.25 | 2 | 1.25 |
| after 7 days at −30° C., % | 0 | 0 | 0 | 0 |
| Classification by the external radiation test (NF-P 92-501) | M$_2$ | M$_2$ | M$_1$ | M$_2$ |

We claim:

1. Process for the manufacture of flame-retardant rigid polyurethane foams by reaction of halogenated polyether-polyols with organic polyisocyanates in the presence of a blowing agent, characterised in that the blowing agent comprises a chlorofluorinated hydrocarbon containing hydrogen chosen from 1,1-dichloro-1-fluoroethane and 1,1,1-trifluoro-2,2-dichloroethane and in that the reaction is carried out in the presence of ethylene glycol.

2. Process according to claim 1, characterised in that ethylene glycol is used at a concentration of at least 0.5 part per 100 parts by weight of halogenated polyether-polyols.

3. Process according to claim 1, characterised in that ethylene glycol is present at a concentration of at most 6.5 parts per 100 parts by weight of halogenated polyether-polyols.

4. Process according to claim 1, characterised in that the reaction is carried out in the presence also of a phosphorated organic compound chosen from the phosphoric esters and the phosphonates.

5. Process according to claim 4, characterised in that the phosphorated organic compound is used at a concentration of approximately 0.5 to 6 parts, expressed as phosphorus, per 100 parts by weight of halogenated polyether-polyols.

6. Process according to claim 1, characterised in that the blowing agent consists of 1,1-dichloro-1-fluoroethane.

* * * * *